M. L. KLINE.
FUEL OIL BURNER.
APPLICATION FILED JULY 25, 1911.
1,031,450.
Patented July 2, 1912.
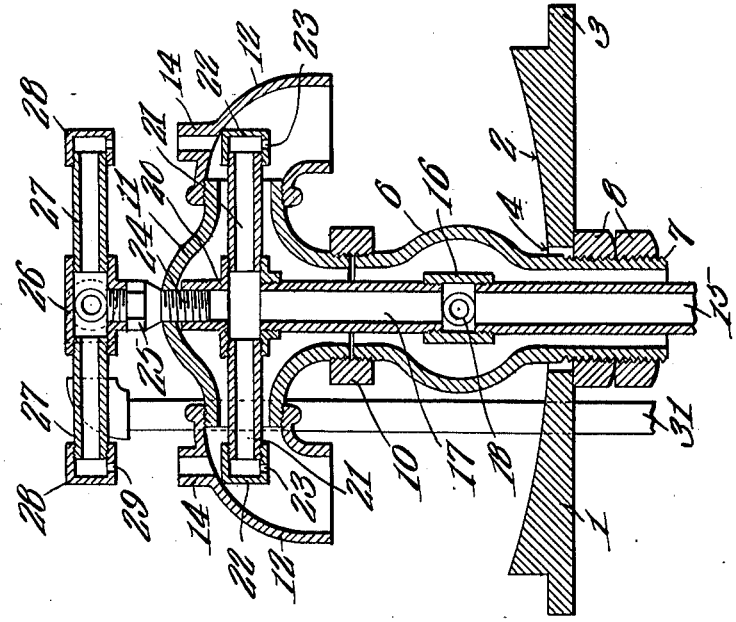

UNITED STATES PATENT OFFICE.

MARTIN L. KLINE, OF AGRICOLA, KANSAS.

FUEL-OIL BURNER.

1,031,450.     Specification of Letters Patent.     Patented July 2, 1912.

Application filed July 25, 1911. Serial No. 640,426.

*To all whom it may concern:*

Be it known that I, MARTIN L. KLINE, a citizen of the United States, residing at Agricola, in the county of Coffey and State of Kansas, have invented a new and useful Fuel-Oil Burner, of which the following is a specification.

It is the object of the present invention to provide a fuel oil burner, which will consume the combustible material, without smoke, a flame of maximum heat resulting.

A further object of the invention is to provide means for securing a proper admixture of air and combustible material, and to provide means for introducing water into the burner, whereby steam may be intermingled with the products of combustion.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in vertical section; parts being shown in elevation; Fig. 2 is a vertical section, the cutting plane in Fig. 2 being at right angles to the cutting plane in Fig. 1.

In carrying out the invention there is provided a base plate 1, depressed upon its upper surface, as shown at 2, and provided along its lower edge with an outstanding peripheral flange 3. The base plate 1 is equipped with a central opening 4, upon either side of which there are other openings 5. The base plate 1 may be of any desired form. The invention further includes a casing, the casing, in its turn, including a pipe connection in the form of a cross, denoted by the numeral 6. The depending arm 7 of the cross 6 is extended through the opening 4, nuts 8 being threaded upon the arm 7, one of the nuts bearing against the base plate 1, and the other of said nuts acting as a lock nut. The lateral branches of the cross 6 carry elbows 9, extended downwardly through the openings 5 in the base plate 1. By means of a suitable connection of any sort, shown at 10, the upper branch of the cross 6 is connected with the lower branch of a T 11, the T 11 being located in a plane at right angles to the plane of the cross 6. The lateral branches of the T 11 carry elbows 12, provided in the upper portions with tubular nipples 14.

The fuel supply pipe is denoted generally by the numeral 15. This pipe 15 carries at its upper end, a cross connection 16, into the upper portion of which is threaded a pipe 17, extended into the T 11. Lateral pipes 18 are secured in the cross connection 16, the pipes 18 extending into the elbows 9. The pipes 18 are terminally closed by means of caps 19. The upper end of the pipe 17 carries a cross 20, the cross 20 supporting lateral pipes 21 extended into the elbows 12. The pipes 21 are terminally closed by means of caps 22, the caps 22 having in their lower portions, openings 23. The pipes 18 and 21 constitute spaced arms of the fuel-supply pipe.

A connecting element is provided, the same preferably taking the form of a plug 24, threaded at both ends, and provided intermediate its ends, with wrench faces 25. The plug or connection 24 is extended through the upper portion of the T 11, and is threaded into the upper branch of the cross connection. Carried by the upper end of the connecting element 24, is a four-way coupling 26, into which are threaded pipes 27, overhanging the elbows 12. The pipes 27 are provided with caps 28, and in the caps 28 there are openings 29, alined with the openings through the nipples 14 of the elbows 12.

Into one side of the coupling 26 is threaded a horizontal pipe 30, united with the vertical pipe 31, the latter, in its turn, being united with the horizontal pipe 32, located below the base plate 1, the pipe 32 being connected with a vertical pipe 33, having a cut-off valve 34, the pipe 33 carrying a tank 35. The lower end of the fuel supply pipe 15 is connected with a horizontal pipe 36, united with a vertical pipe 37, having a cut-off valve 38, the pipe 37 carrying a tank 39. It will of course be understood that the specific arrangement of piping will be altered, in practice, to suit the exigencies of the particular case.

The tank 35 is adapted to contain water, the tank 39 containing oil or the like. These tanks may be left open, so as to afford a gravity feed, or, if desired, they may be closed, so as to act as storage receptacles for compressed air, the compressed air being supplied to the tanks at 35 and 39 in any desired manner.

In practical operation, presupposing that the valves 34 and 38 are open, the fuel which is in the tank 39 will flow downwardly through the pipes 37, 36, 15 and 17, into the pipes 21, the fuel passing outwardly through the openings 23 in the caps 22. At the openings 23, the fuel will be ignited, the flame passing outwardly through the elbows 12, air being supplied through the connection 6, through the T 11, and through the elbows 12, as will be understood readily. The water which is in the tank 35 will flow downwardly through the pipe 33, through the pipe 32, and pass by way of the pipes 31 and 30, into the pipes 27. The water which is in the pipes 37 will pass drop by drop, through the openings 29 in the caps 28, the falling water entering nipples 14. The water, entering the elbows 12, will be converted into steam, and the flame at the ends of the pipes 21 will burn relatively free from smoke, owing to the thorough admixture of combustible material, air and steam, effected by the construction hereinbefore set forth. The oil will enter the lateral pipes 18, these pipes 18 serving to afford additional space in which the oil may be heated, and converted wholly or partially into gas, before passing into the pipes 21. The expansion of the oil in the pipes 18, together with the fact that fuel is constantly flowing through the pipes 17 and 15, will serve to effect a proper circulation in the pipes 18.

The device is so constructed that it may be employed in cook stoves, in furnaces, and elsewhere, where a clean flame of great heat is required.

Having thus described the invention, what is claimed is:—

1. A device of the class described comprising a casing, open for the passage of air and provided with a lateral extension; a fuel supply pipe in the casing, the pipe having spaced lateral arms, one of which is closed, the other of which is open and located in the lateral extension of the casing; there being an opening in the lateral extension of the casing; and means for supplying water in small quantities through said opening.

2. A device of the class described comprising a casing, open for the passage of air and provided with a lateral extension; a fuel supply pipe in the casing, the pipe having spaced lateral arms, one of which is closed, the other of which is open and located in the lateral extension of the casing; there being an opening in the lateral extension of the casing; and a water supply pipe connected with the casing and having a lateral branch provided with an opening alined with the opening in the lateral extension of the casing.

3. A device of the class described comprising a casing having a lateral extension; a fuel supply pipe in the casing; a coupling upon the pipe; a lateral arm connected with the coupling and protruding into the extension, said arm being provided with an outlet; a connecting element extended through the casing and united with the coupling; a coupling upon the connecting element; and a water supply pipe carried by the last named coupling, the water supply pipe and the lateral extension of the casing being provided with alined openings.

4. A device of the class described comprising a T; elbows upon the ends of the T; a fuel supply pipe extended into the T; a coupling upon the fuel supply pipe; lateral pipes connected with the coupling, and extended into the elbows; a connecting element carried by the coupling, and extended through the T; a coupling carried by the connecting element; and pipes carried by the last named coupling and overhanging the elbows; the last named pipes and the elbows being provided with alined openings.

5. A device of the class described comprising a T; elbows carried by the T; a fuel supply pipe located within the T; a coupling carried by the fuel supply pipe; lateral pipes carried by the coupling and extended into the elbows; a connecting element carried by the coupling, and extended through the T; a coupling upon the connecting element; lateral pipes carried by the last named coupling; there being alined openings in said lateral pipes and in the elbows; a cross connected with the lower end of the T and inclosing the supply pipe; and elbows upon the lateral branches of the cross; the fuel supply pipe having closed extensions, protruding laterally into the last named elbows.

6. A device of the class described comprising an air pipe having a lateral extension; a fuel pipe in the air pipe and having a lateral branch located in the extension; and a water pipe above the extension; the water pipe, the branch and the extension having openings disposed in approximate vertical alinement.

In testimony that I claim the foregoing as my own, I have hereto affixed my signature in the presence of two witnesses.

MARTIN L. KLINE.

Witnesses:
L. R. GEPHART,
WHEELER TRUITT.